Figure 1:
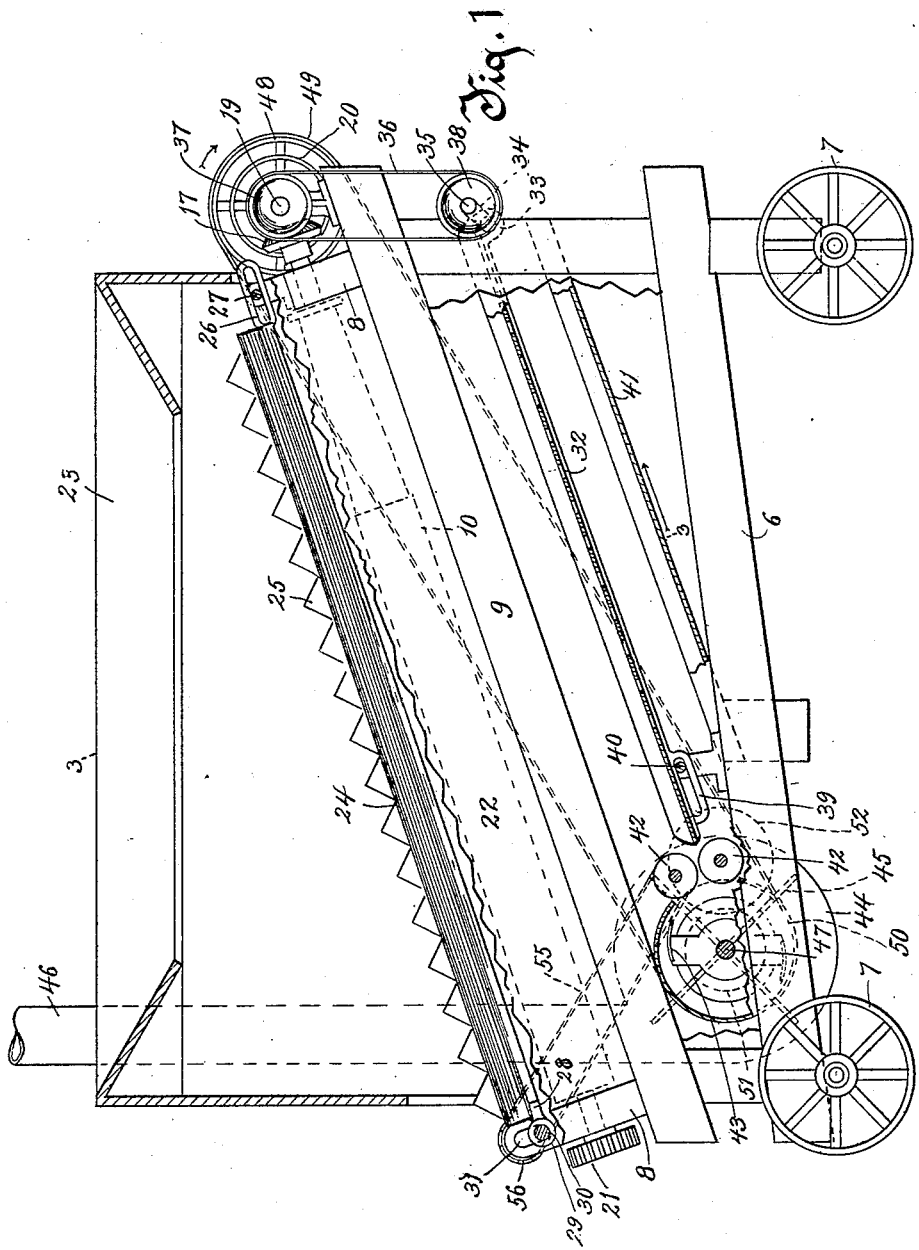

No. 677,471. Patented July 2, 1901.
A. ROSENTHAL.
COMBINED CORN HUSKER AND FODDER SHREDDER.
(Application filed Feb. 4, 1901.)
(No Model.) 3 Sheets—Sheet 1.

Witnesses.
Inventor.
August Rosenthal
By Benedict & Morsell
Attorneys.

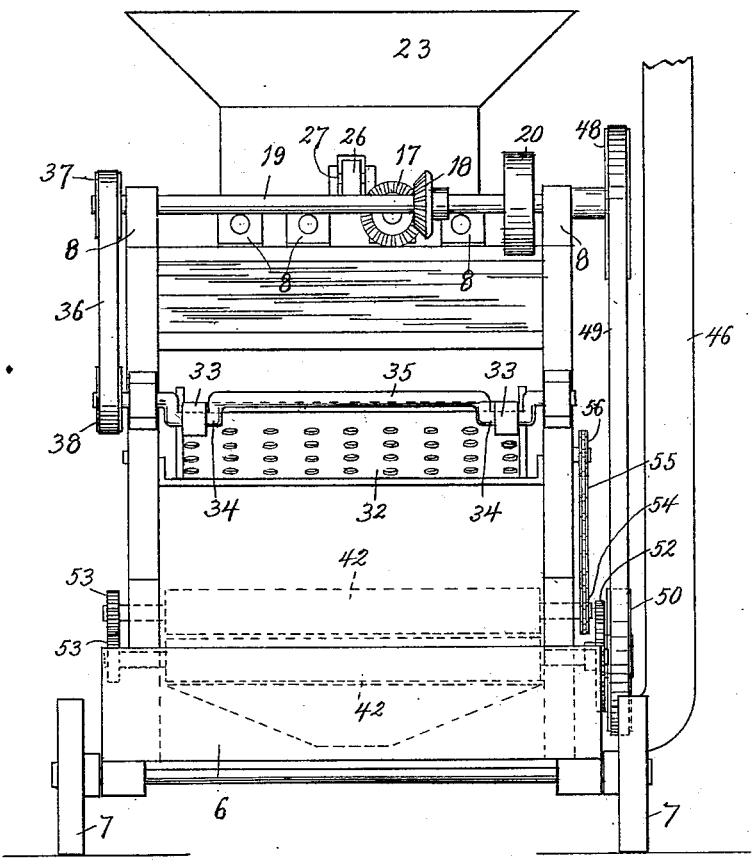
Fig. 2.
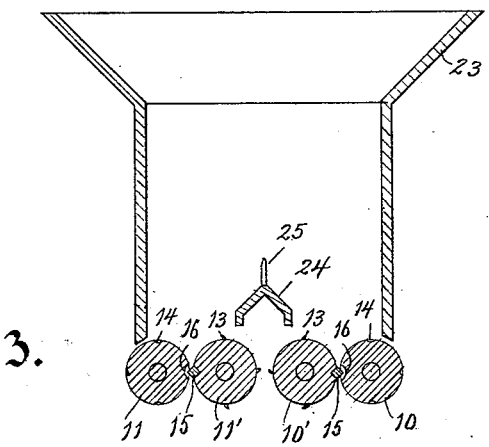
Fig. 3.
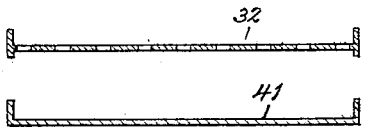

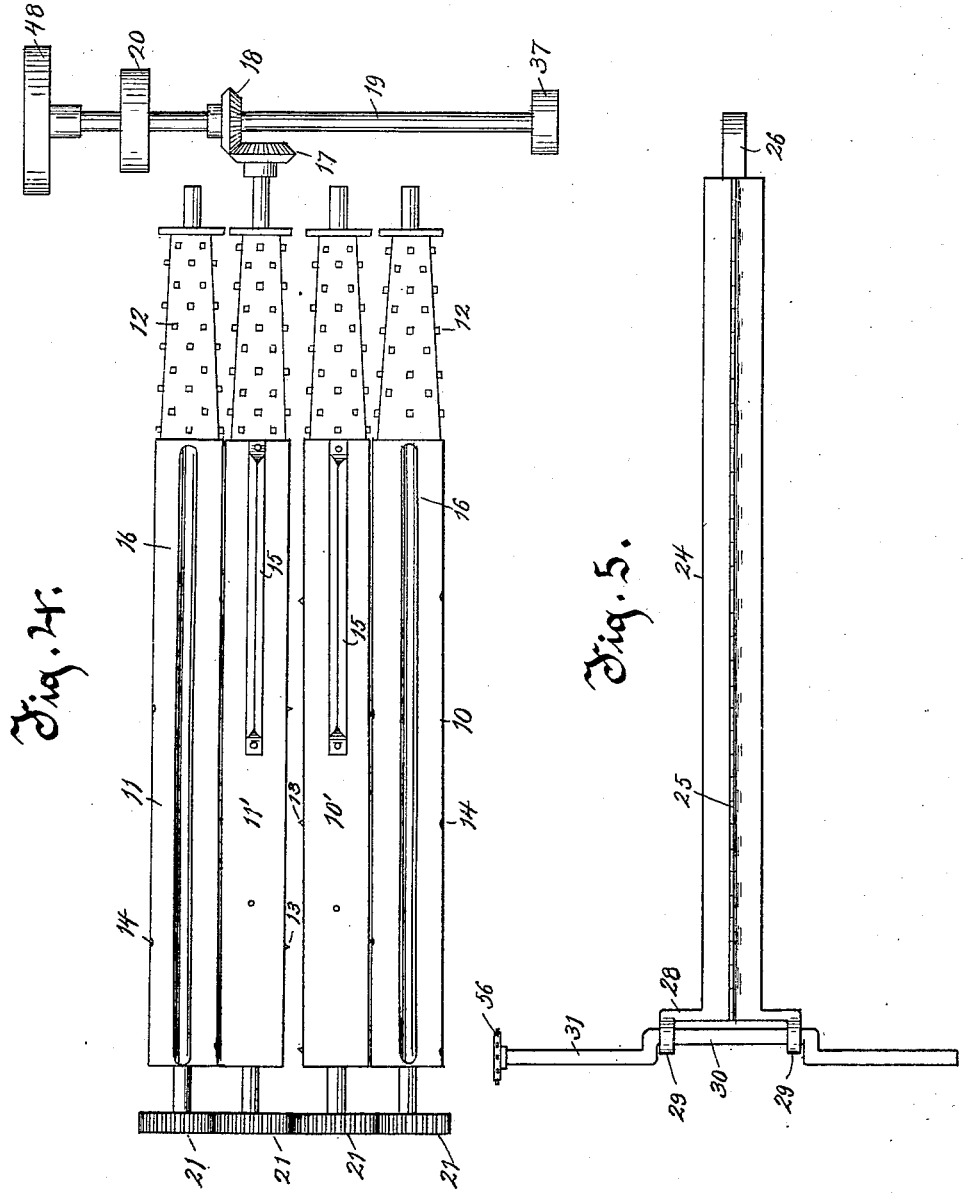

UNITED STATES PATENT OFFICE.

AUGUST ROSENTHAL, OF MILWAUKEE, WISCONSIN, ASSIGNOR TO ROSENTHAL HUSKER COMPANY, OF SAME PLACE.

COMBINED CORN-HUSKER AND FODDER-SHREDDER.

SPECIFICATION forming part of Letters Patent No. 677,471, dated July 2, 1901.

Application filed February 4, 1901. Serial No. 45,822. (No model.)

*To all whom it may concern:*

Be it known that I, AUGUST ROSENTHAL, residing in Milwaukee, in the county of Milwaukee and State of Wisconsin, have invented a new and useful Improvement in a Combined Corn-Husker and Fodder-Shredder, of which the following is a description, reference being had to the accompanying drawings, which are a part of this specification.

My invention has relation to improvements in combined corn-huskers and fodder-shredders.

It is well understood by those familiar with the operation of this class of machines that in the husking of the ears of corn some of the corn is apt to be shelled from the ears, and this shelled corn will pass downwardly with the severed stalks and between the husking-rollers, and it has been found very difficult to sift and separate such shelled corn from the stalks after said stalks have been cut into fodder.

It is the primary object of my invention to provide means for automatically sifting any shelled corn which may have passed with severed stalks between the husking-rollers and for separating said shelled corn from the stalks.

With the above primary object in view the invention consists of the devices and parts or their equivalents, as hereinafter more fully set forth.

In the accompanying drawings, Figure 1 is a side elevation of my invention, parts in section and parts broken away. Fig. 2 is an end elevation. Fig. 3 is a section on the line 3 3 of Fig. 1. Fig. 4 is a plan view of the husking-rollers and mechanism for driving the same, and Fig. 5 is a view of the twine-cutting mechanism.

For supporting the operating parts of my invention any desired form of framework may be employed. I have in the accompanying illustration shown a form of framework 6, which I find answers all requirements. If it is desired to make the machine portable, this frame may be mounted upon wheels 7.

The husking-rollers are journaled in the frame and are arranged at a gradual downward incline from the feed end of the machine to the discharge end thereof, the journals of said rollers being mounted in bearings 8 8, extending upwardly from the end connecting-pieces of inclined side beams 9 9. While the several rollers employed in connection with my invention may be of any desired construction best adapted to perform the functions intended, yet I prefer to employ rollers similar to the rollers shown and described in my United States Letters Patent for improvements in combined corn-huskers and fodder-shredders, No. 621,505, dated March 21, 1899. These rollers are arranged in sets, two of the rollers of one set being indicated by the numerals 10 10' and the two rollers of the other set by the numerals 11 11'. A space is left between the two sets of rollers, so that the inner rollers of the two sets will clear each other without contacting, while the surfaces of the two rollers of each set are in close proximity, so as to almost contact. The higher ends of these several rollers constitute the receiving ends thereof, while the remaining portions thereof constitute the husking parts. The front receiving ends of the rollers are provided with longitudinal rows of radially-projecting teeth 12, which rows of teeth alternate with each other longitudinally, the rows of teeth of one roller of one set entering the intermediate spaces axially or longitudinally of the other roller as the rollers revolve. These teeth 12 as the corn is fed to the rollers take hold of the stalks and carry said stalks between the rollers. The husking portions of the inner rollers 10' and 11' are provided with a number of projecting husking-pins 13 and the outer rollers 10 and 11 with registering recesses 14 to receive said pins as the rollers revolve. The husking portions of the rollers 10' and 11' are shown as having secured thereto diamond-shaped nippers 15 15, which nippers advisably extend from the inner ends of the receiving portions of the rollers lengthwise of the husking portions of said rollers for substantially one-half of the lengths of the husking portions. The husking portions of the rollers 10 and 11 are also formed with recesses 16 16, which are so located as to receive therein the projecting edges of the nippers as the rollers revolve toward each other. The recesses 16 advisably extend throughout the entire length or substantially the entire length of the husking portions of the rollers 10 and 11. The cornstalks are fed horizontally to the rollers, with their lengths coincident to the lengths of the rollers, as hereinafter explained. The moment the stalks come in contact with the surfaces of the sets of rollers the teeth 12 engage the stalks and effect the pulling of said stalks into the widest portions of the spaces between the rollers, at the receiving ends of said rollers, where the stalks are gradually worked down toward the more narrow portions of said spaces. The nippers 15 also come into play as the rollers are revolved. Said nippers during such revolution pass into the recesses 16, and the stalks are thereby necessarily pulled in between the points or edges of the nippers and the walls of the recesses, being thereby compelled to make a very short turn. The sharpened edge of the point of the nipper then severs the stalks from the ears and said stalks are carried between and below the rollers. The ears of corn of course slide down the rollers and are acted upon by the husking-pins 13 and are thereby stripped of their husks, said husks being carried between the rollers. The ears of corn finally slide off the rear ends of the rollers into a suitable receptacle.

Referring to the mechanism for rotating the rollers, the projecting journal of one of the rollers, in this instance the journal of the roller 11', carries thereon a beveled gear-wheel 17, and this gear-wheel is in mesh with a similar gear-wheel 18, mounted on a main drive-shaft 19. This shaft has mounted thereon a belt-wheel 20, around which a belt (not shown) extending from any suitable source of power is passed in order to drive the shaft. The journals of the rear ends of the rollers have mounted thereon intermeshing gears 21. It is obvious that as the gear-wheel 17 is rotated from the drive-shaft the roller 11' will be rotated, and its rotation through the intermeshing gears 21 will be communicated to all of the several rollers.

Above the upper longitudinal beams 9, hereinbefore referred to, are upper longitudinal side boards 22, forming outer side pieces for the rollers.

Arranged above the rollers is a hopper-like frame 23, and extending longitudinally of the lower portion of this hopper is mechanism for cutting the twine which binds the bundles or sheaves of corn, it being understood that the corn is not deposited in the hopper in a loose condition, but in bundles or sheaves tied with twine. This cutting mechanism consists of a longitudinal bar 24, having upon its upper side a series of saw-like teeth 25. At its forward end this bar is provided with a projecting link or elongated slotted portion 26, which link or slotted portion receives a transverse pin 27. At its rear end the bar 24 is provided with a cross-piece 28, which in turn is provided with rearwardly-projecting eyed portions 29 29. These eyed portions receive therethrough a crank 30, formed on a transverse shaft 31. It is obvious that when the shaft 31 is rotated a longitudinally-reciprocating motion is imparted to the bar 24, and this will cause the teeth 25 of said bar to be carried back and forth across and in contact with the binding-cords of the sheaves, and hence sever said cords.

Below the husking and shredding rollers is a sieve 32, which is arranged at a gradual incline from the front toward the rear. This sieve is provided at one end with projecting straps 33 33, which are hung on cranks 34 34, formed on a transverse shaft 35. Rotation is imparted to the shaft 35 by means of a belt 36, which passes around a pulley 37 on one end of the main shaft 19 and around another pulley 38 on the shaft 35. Upon the under side of the rear end of the sieve is a slotted piece 39, which receives a transverse pin 40. It will be evident that as the shaft 35 is rotated a longitudinally-reciprocating movement is imparted to the sieve. Beneath the sieve and similarly inclined is a longitudinal tray or receptacle 41. As most clearly shown in Figs. 1 and 3, both the sieve and the tray therebeneath are provided with the upwardly-extending side flanges, forming guards against the escape sidewise of the material deposited thereon.

Located in close proximity to the rear end of the sieve are feed-rolls 42 42. Just to the rear of the feed-rolls is a rotary cutter 43 for tearing or cutting the stalks fed thereto from between the feed-rolls into fodder. This fodder then passes into a fan-casing 44 and is there acted upon by a rotary fan 45 and is forced upwardly thereby in a conduit 46, extending from the fan-casing to the place of deposit. The rotary cutting mechanism and the fan are shown as mounted upon the same shaft 47.

The means for imparting rotary motion to the fan, the rotary cutter, and the feed-rolls and reciprocating motion to the twine-cutter 24 will now be explained. Mounted upon the main shaft 19 is a belt-wheel 48. Around this wheel passes a belt 49, said belt extending to and passing around a belt-wheel 50 on the shaft 47. By this connection the shaft 47 is rotated, and consequently the fan and the rotary cutter mounted thereon. The shaft 47 has also mounted thereon a pinion 51, and this pinion meshes with a larger toothed wheel 52, mounted on the shaft of the lower feed-roll 42. The opposite ends of the shafts of the two feed-rolls are geared together by means of gear-wheels 53 53. It is evident that as the lower feed-roll is rotated by the intermeshing gears 51 and 52 rotation is also imparted to the upper feed-roll by the intermeshing gears 53 53. The end of the shaft of the upper feed-roll opposite to the end carrying the gear-wheel 53 has mounted thereon a sprocket-wheel 54. Passing around this sprocket-wheel is a sprocket-chain 55, and this sprocket-chain is extended to and passed around a sprocket-wheel 56 on the end of the crank-shaft 31. It follows that when the upper feed-roll is rotated rotation will, by the described connection of the sprocket-chain 55, cause the crank-shaft 31 to be rotated, and hence a longitudinal reciprocating motion imparted to the cutter-bar 24.

The general operation of my invention will now be explained.

The sheaves or bundles of corn are deposited lengthwise in the hopper 23, as hereinbefore explained. Power being transmitted to the main shaft 19, a reciprocating motion will be given to the cutter-bar in the manner previously described, and the teeth 25 of said cutter-bar will sever the twine, and the loose corn will then pass onto the husking-rollers. By the action of these rollers the cornstalks are severed from the ears of corn, and said stalks are carried between the rollers and deposited upon the sieve 32. The ears of corn are also husked and the husks carried between the rollers and likewise deposited upon the sieve. The ears of corn, however, are left on the upper surfaces of the rollers and slide down said rollers to a place of deposit. Any corn which may have been accidentally shelled from the ears in the operation of husking will also pass between the rollers and be deposited upon the sieve. The sieve, as previously explained, while the machine is in operation has a vibratory movement imparted thereto, and this vibratory movement will shake and separate the shelled corn and compel said corn to pass through the openings of the sieve and be received in the tray 41 therebeneath. The cornstalks and husks, however, are too large to pass through the openings of the sieve, and these stalks and husks by reason of the inclination of the sieve and the vibratory movement imparted thereto slide down to the feed-rollers and are carried between said feed-rollers to the rotary cutter, where they are torn or cut into fodder. From the rotary cutter the fodder passes into the fan-casing and is there acted upon by the fan and forced or blown upwardly into the conduit to a place of deposit.

What I claim as my invention is—

1. In a corn-husking machine, the combination of husking-rollers adapted to have cornstalks pass therebetween, and provided with means for separating the stalks from the ears, and for husking the ears, means for rotating the rollers, a sieve beneath the rollers and adapted to receive thereon the stalks and husks which pass between the rollers, and also adapted to permit any shelled corn which may have passed between the rollers and thereby deposited on the sieve to pass through the openings of said sieve to a place of deposit, feed-rolls at one end of the sieve, and between which rolls the stalks and husks are fed by the sieve, a rotary cutter adapted to act on the stalks and husks as they leave the feed-rolls, a fan-casing having a conduit leading therefrom, and to which casing the cut stalks and husks pass from the rotary cutter, and a fan within the casing for forcing or blowing the cut material into the conduit and through said conduit to a place of deposit.

2. In a corn-husking machine, the combination of husking-rollers adapted to have cornstalks pass therebetween, and provided with means for separating the stalks from the ears, and for husking the ears, means for rotating the rollers, an inclined sieve beneath the rollers, adapted to receive thereon the stalks and husks which pass between the rollers, and also adapted to permit any shelled corn which may have passed between the rollers and thereby deposited on the sieve to pass through the openings of said sieve to a place of deposit, feed-rolls at one end of the sieve, the sieve being on a gradual downward incline toward the rolls, and said rolls adapted to receive therebetween the stalks and husks which are fed downwardly thereto by the downwardly-inclined sieve, a rotary cutter adapted to act on the stalks and husks as they leave the feed-rolls, a fan-casing having a conduit leading therefrom, and to which casing the cut stalks and husks pass from the rotary cutter, and a fan within the casing for forcing or blowing the cut material into the conduit, and through said conduit to a place of deposit.

3. In a corn-husking machine, the combination of husking-rollers adapted to have cornstalks pass therebetween, and provided with means for separating the stalks from the ears, and for husking the ears, means for rotating the rollers, a sieve beneath the rollers and adapted to receive thereon the stalks and husks which pass between the rollers, and also adapted to permit any shelled corn which may pass between the rollers and be thereby deposited on the sieve to pass through the openings of said sieve to a place of deposit, a main shaft having a wheel thereon, means for driving said main shaft, an auxiliary shaft having a wheel thereon and also having a crank connection with one end of the sieve, the opposite end of said sieve provided with a slotted portion, a transverse pin entering said slot, and a belt connection between the wheel of the main shaft and the wheel of the auxiliary shaft.

4. In a corn-husking machine, the combination of husking-rollers adapted to have cornstalks pass therebetween, and provided with means for separating the stalks from the ears, and for husking the ears, means for rotating the rollers, a sieve beneath the rollers, and adapted to receive thereon the stalks and husks which pass between the rollers, and also adapted to permit any shelled corn which may pass between the rollers and be thereby deposited on the sieve to pass through the openings of said sieve to a place of deposit, a hopper above the roller, a cutter-bar running longitudinally of the lower portion of the hopper, said bar having a slotted portion at one end, a pin passing through said slotted portion, a shaft having a crank connection with the opposite end of the bar, said shaft having also mounted thereon a wheel, feed-rolls at one end of the sieve, the shafts thereof at corresponding ends having intermeshing gears, and the shaft of the lower roll having at its opposite end a toothed wheel, and the shaft of the upper roll at this end also provided with a wheel, a shaft at a desired distance from the feed-rolls and having a cutter mounted thereon, said shaft also having a wheel mounted thereon, a fan-casing having a conduit leading therefrom, a fan mounted on the cutter-shaft and located within the casing, a main shaft having a wheel thereon, means for driving the main shaft, a belt leading from the wheel of the main shaft to the wheel of the cutter-shaft; a toothed wheel on the cutter-shaft meshing with the toothed wheel on one end of the shaft of the lower feed-roll, and a belt connecting the wheel on one end of the upper feed-rool with the wheel on the end of the crank-shaft which actuates the cutter-bar.

In testimony whereof I affix my signature in presence of two witnesses.

AUGUST ROSENTHAL.

Witnesses:
A. L. MORSELL,
ANNA V. FAUST.